(12) United States Patent
    Simhon et al.

(10) Patent No.: US 12,020,297 B1
(45) Date of Patent: Jun. 25, 2024

(54) RELEVANCE-BASED SCHEMA MATCHING FOR TARGETED CATALOG ENRICHMENT

(71) Applicant: Amazon Technologies, Inc., Seattle, WA (US)

(72) Inventors: Shlomo Simhon, Aventura, FL (US); Evan J Shieh, Fall City, WA (US); Geetha Sal Aluri, Newark, CA (US); Georgios Papachristoudis, New York, NY (US); Isil Doga Yakut Kilic, Seattle, WA (US); Dhanya Raghu, Seattle, WA (US); Gopesh Desai, Westfield, NJ (US); Mohamed Ahmed Yakout, Redmond, WA (US); Paul Gedeon, Seattle, WA (US); Albert Tamayev, Forest Hills, NY (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 17/319,929

(22) Filed: May 13, 2021

(51) Int. Cl.
    *G06Q 10/10* (2023.01)
    *G06F 17/00* (2019.01)
    *G06Q 30/0282* (2023.01)
    *G06Q 30/0601* (2023.01)

(52) U.S. Cl.
    CPC ..... *G06Q 30/0282* (2013.01); *G06Q 30/0603* (2013.01); *G06Q 30/0641* (2013.01)

(58) Field of Classification Search
    CPC .......... G06Q 30/0282; G06Q 30/0603; G06Q 30/0641
    USPC ................................................. 705/1.1–912
    See application file for complete search history.

(56) References Cited

U.S. PATENT DOCUMENTS

| | | | |
|---|---|---|---|
| 7,249,135 B2 | 7/2007 | Ma et al. | |
| 7,353,226 B2 | 4/2008 | Coen et al. | |
| 8,219,596 B2 | 7/2012 | Peukert | |
| 8,249,885 B2 * | 8/2012 | Berkowitz | G06Q 30/0625 705/1.1 |

(Continued)

OTHER PUBLICATIONS

Jain, Sarika. "Exploiting knowledge graphs for facilitating product/service discovery." arXiv preprint arXiv:2010.05213 (2020). (Year: 2020).*

(Continued)

*Primary Examiner* — Jonathan P Ouellette
(74) *Attorney, Agent, or Firm* — Robert C. Kowert; Kowert, Hood, Munyon, Rankin & Goetzel, P.C.

(57) ABSTRACT

Methods, systems, and computer-readable media for relevance-based schema matching for targeted catalog enrichment are disclosed. A catalog management system determines textual descriptors associated with a category of items in a catalog. The system determines relevant attributes for the category based (at least in part) on analysis of the textual descriptors. The relevant attributes are selected from a larger set of candidate attributes for the category. The system modifies the catalog based (at least in part) on schema matching for a plurality of items in the category. The items are associated with descriptive terms from a plurality of data sources and expressed according to a plurality of source schemas. For an individual item, the schema matching determines a correspondence between one or more of the descriptive terms in one of the source schemas and a corresponding attribute in a target schema comprising the relevant attributes.

20 Claims, 7 Drawing Sheets

(56) References Cited

U.S. PATENT DOCUMENTS

| | | | |
|---|---|---|---|
| 8,577,857 B2 | 11/2013 | Nikovski | |
| 10,546,057 B2 | 1/2020 | Eakins | |
| 2005/0060324 A1* | 3/2005 | Johnson | .......... G06Q 30/06 |

OTHER PUBLICATIONS

Tomas Mikolov, et al., :Efficient Estimation of Word Representations in Vector Space, arXiv:1301.3781v3, Sep. 7, 2013, pp. 1-12.
Bhaskar Mtra, et al., "A Dual Embedding Space Model for Document Ranking", arXiv:1602.01137v1, Feb. 2, 2016, pp. 1-10.
Eliyahu Kiperwasser, et al., "Simple and Accurate Dependency Parsing Using Bidirectional LSTM Feature Representations", arXiv:1603.04351v3, Jul. 20, 2016, pp. 1-15.
Dinghan Shen, et al., "Baseline Needs More Love: On Simple Word-Embedding-Based Models and Associated Pooling Mechanisms", arXiv:1805.09843v1, May 24, 2018, pp. 1-13.
Guineng Zheng; et al., "OpenTag: Open Attribute Value Extraction from Product Profiles", arXiv:1806.01264v2, Oct. 6, 2018, pp. 1-10.
Jacob Devlin, et al., "BERT: Pre-training of Deep Bidirectional Transformers for Language Understanding", arXiv:1810.04805v2, May 24, 219, pp. 1-16.
Ruiying Geng, et al., "Induction Networks for Few-Shot Text Classification", arXiv:1902.10482v2, Sep. 29, 2019, pp. 1-10.
Wen-Syan Li, et al., "SEMINT: A tool for identifying attribute correspondences in heterogeneous databases using neural networks", Data & Knowledge Engineering 33, 2000, pp. 49-84, Source: https://www.cerias.purdue.edu/assets/pdf/bibtex_archive/2001-77.pdf.
Nils Barlaug, et al., "Neural Networks for Entity Matching: A Survey", arXiv:2010.11075v1, Oct. 21, 2020, pp. 1-36.
Erhard Rahm, et al., "A Survey of Approaches to Automatic Schema Matching", ResearchGate, The VLDB Journal 10, 2001, pp. 334-350.
Prodromos Kolyvakis, et al., "DeepAlignment: Unsupervised Ontology Matching With Refined Word Vectors", in Proceedings of NAACL-HLT 2018, Jun. 1-6, 2018, Association for Computational Linguistics, pp. 787-798.
George A. Miller, "WordNet: A Lexical Database for English", in Communications of the ACM, Nov. 1995, vol. 38, No. 11, pp. 39-41.
Renee J. Miller, "Schema Mapping as Query Discovery", in Proceedings of the 26th VLDB Conference, 2000, pp. 77-88.
Ursin Brunner, et al., "Entity Matching with Transformer Architectures—A Step Forward in Data Integration", In Proceedings of the 23rd International Conference on Extending Database Technology, Mar. 2020, pp. 463-473.
Kenji Nozaki, et al., "Sematic Schema Matching for String Attribute with Word Vectors and its Evaluation", International Journal of Networked and Distributed Computing, In 2019 6th International Conference on Computational Science/ Intelligence and Applied Informatics (CSII), Jan. 2019, pp. 25-30.
Piotr Bojanowski, et al., "Enriching Word Vectors with Subword Information", Transactions of the Association for Computational Linguistics, vol. 5, Published Jun. 2017, pp. 135-146, Retrieved from Downloaded from http://www.mitpressjournals.org/doi/pdf/10.1162/tacl_a_00051 by guest on May 4, 2021.
Daniel Cer, et al., "Universal Sentence Encoder for English", in Proceedings of the 2018 Conference on Empirical Methods in Natural Language Processing (System Demonstrations), Oct. 31-Nov. 4, 2018, pp. 169-174.

* cited by examiner

RELEVANCE-BASED SCHEMA MATCHING FOR TARGETED CATALOG ENRICHMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Web servers and other Internet-accessible servers backed by distributed systems may provide stores that offer goods and/or services to consumers. For instance, consumers may visit a merchant's website to view and purchase goods and services offered for sale by a set of vendors. Some Internet-accessible stores include large electronic catalogs of items offered for sale. For each item, such electronic catalogs typically include at least one product detail page that specifies various information about the item, such as a description of the item, one or more pictures of the item, as well as specifications (e.g., weight, dimensions, capabilities) of the item. A distributed system may include many different computing resources and many different services that interact with one another, e.g., to produce a product detail page for consumption by a customer.

Figure 1:
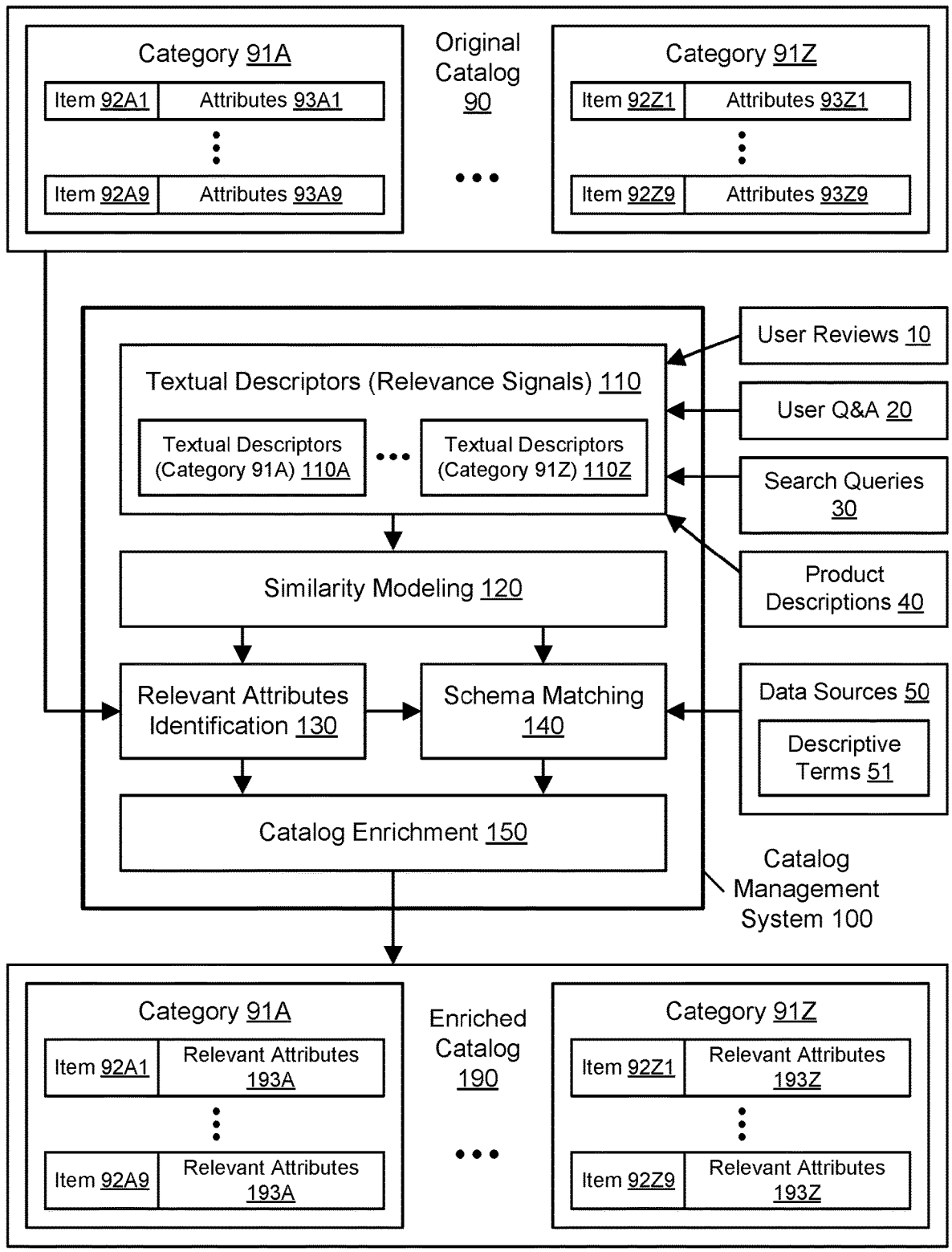
FIG. 1 illustrates an example system environment for relevance-based schema matching for targeted catalog enrichment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for relevance-based schema matching for targeted catalog enrichment are described. Product catalogs offered by Internet-accessible stores may rely on structured product data to provide a positive experience for users (e.g., customers). For example, customers may rely on structured product data to search for, browse, and compare different products in a time-efficient and resource-efficient manner. For larger catalogs, product information may be provided according to many (e.g., millions of) different manufacturer and vendor schemas. These heterogeneous schemas may describe products in varying and inconsistent ways. Schema matching may include finding correspondences between concepts in different data sources with different schemas such that the concepts can be mapped from the heterogeneous source schemas to a unified target schema. Some prior approaches for schema matching have been applied only to a relatively small number of source schemas, attributes, and contexts (e.g., matching movie attributes from media knowledge bases). However, schema matching for Internet-accessible product catalogs may involve millions of noisy, heterogeneous schemas that span thousands of categories and attributes. Prior approaches for schema matching may not scale to a very large catalog maintained by an Internet-accessible store.

The aforementioned challenges, among others, are addressed by embodiments of the techniques described herein, whereby techniques for schema matching may be used to enrich and improve a product catalog by unifying heterogeneous product data according to a consistent and unified catalog schema with attributes deemed to be most relevant to users. In some embodiments, a catalog management system may implement scalable schema matching that utilizes unsupervised domain-specific attribute representations and general attribute similarity metrics. The catalog management system may identify the most relevant attributes for a given product category based (at least in part) on existing customer information such as customer reviews, customer question-and-answer (Q&A) forums, and search queries. The catalog management system may then prioritize among candidate attributes to consolidate relevant product facts from multiple manufacturers and vendors, e.g., with little to no labeled data. The catalog management system may enrich catalog data comprising millions of attribute enumerations sourced from tens of thousands of schemas across a wide range of product categories. The catalog management system may reduce manual annotation efforts by automating schema matching on targeted product facts, resulting in high accuracy, precision, and recall for important attributes that contribute to customer interest. The enriched catalog may include product descriptions that are more relevant to customer interests and more uniform in expression, thus improving the customer experience.

As one skilled in the art will appreciate in light of this disclosure, embodiments may be capable of achieving certain technical advantages, including some or all of the following: (1) improving the scalability of computer-implemented tasks for schema matching from heterogeneous source schemas to a target schema for a catalog of items; (2) improving the accuracy of computer-implemented tasks for schema matching using a domain-specific approach for item categories; (3) improving the speed of finding items in a catalog using product descriptions that are more relevant to customer interests and more uniform in expression; (4) improving the quality and reducing the storage size of a catalog by using relevance-based schema matching to consolidate and reduce item attributes; and so on.

FIG. 1 illustrates an example system environment for relevance-based schema matching for targeted catalog enrichment, according to some embodiments. A catalog management system 100 may manage a catalog 90 that describes attributes of products (e.g., goods and services) offered through an Internet-accessible store. The catalog 90, also referred to as an electronic catalog, may include many items (e.g., millions of items) from many different manufacturers and vendors. Customers may search the catalog 90 using search queries or may browse categories of items in order to identify desired items. Customers may then purchase, rent, lease, view, listen to, or otherwise engage in transactions regarding particular items with sellers of those items. The catalog items 92A-92Z may be classified in different categories 91A-91Z. Examples of categories 91A-91Z may include clothing, electronics, books, health products, grocery items, streaming audio, streaming video, and so on. Categories 91A-91Z may be organized in a hierarchy, e.g., with some categories representing root nodes in a tree-like data structure, other categories representing intermediate nodes with both parents and children, and yet other categories representing leaf nodes with no children. In some embodiments, a given item may belong to (or be classified in) more than one category. Manufacturers and/or vendors may characterize and differentiate items using titles, descriptive text, and so on. At least some of these descriptive terms may be captured using attributes, e.g., name-value pairs or other combinations of attribute names and attribute values. For example, items 92A1 through 92A9 in category 91A may be described using attribute 93A1 through attribute 93A9, while items 92Z1 through 92Z9 in category 91Z may be described using attribute 93Z1 through attribute 93Z9.

An Internet-accessible store may support Internet-based transactions (e.g., the sale, rental, or lease of products) involving diverse datasets, including one or more product catalogs (e.g., catalog 90) that have been sourced from a variety of domain schemas and product categories 91A-91Z. In some embodiments, the catalog management system 100 may be used with a diversity of product categories 91A-91Z and a resulting diversity of schemas and item attributes. For example, a schema used to model computer monitors may include an attribute for "screen-size" while for women's swimwear a schema may include an attribute for "top-style." Different source schemas may represent different namespaces for attribute names and/or attribute values. Different source schemas are often provided by different vendors. Datasets of descriptive terms 51 across various domain schemas from different data sources 50 (e.g., different manufacturers or vendors) may represent categories and attributes in differing ways. For example, one data source may include an attribute "Flash Memory: included," another data source may include an attribute "Memory Card: Micro SD 64 GB," and a third data source may include an attribute "Description: 18 MP, 16× Digital Zoom, 1 TB Micro SD." As a further example, the attributes 93A1 for one item 92A1 may differ from the attributes 93A9 for another item 92A9 in the same category 91A because the two items were described in different ways by different vendors. Descriptive terms 51 may overlap with attributes in the catalog 90, e.g., to the extent that those attributes were specified by the same data sources 50. By consolidating product data 51 from these different sources 50 in a consistent, structured representation (e.g., a unified target schema), the catalog management system 100 may provide rich customer experiences for even very large catalogs including millions of items. For example, the catalog management system 100 may enable users to search for products, make informed decisions about those products, and enter into transactions involving those products without consuming excessive computing resources, memory resources, storage resources, and network resources that might be required for a larger, noisier catalog.

In some embodiments, the catalog management system 100 may be used to enrich a structured knowledge base other than a catalog. For example, the system 100 may enable consolidation of attributes or fields in a knowledge graph comprising nodes and edges. As another example, the system 100 may enable consolidation of attributes or fields of a knowledge base that stores medical records sourced from different healthcare providers. In performing enrichment of a knowledge graph or other structured knowledge base, the system 100 may perform schema matching to map different source schemas with different namespaces to a single target schema with a unified namespace.

The catalog management system 100 may perform schema matching 140 with data at a large scale, e.g., where the number of available domain schemas is in the order of millions due to the involvement of many different manufacturers, vendors, and categories. The catalog management system 100 may perform schema matching 140 across diverse product schemas that often lack grammatical structure and carry context-specific semantics. Using schema matching techniques 140, the catalog management system 100 may enrich existing heterogeneous, noisy, and/or incomplete catalog data. The catalog management system 100 may implement a catalog augmentation or enrichment process 150 by training a similarity model 120 using customer-relevant textual descriptors of items, using a relevant attributes identification component 130 to identify customer-relevant attributes for a product category in an unsupervised fashion, and prioritizing a schema matching 140 model to help consolidate product descriptors from multiple sources (e.g., manufacturers and vendors). Customer-relevant attributes may include attributes that contribute to customer interest about products and that may tend to drive customer interactions with the catalog. For a given category, the catalog management system 100 may select relevant attributes from among existing attributes (e.g., attributes 93A1 to 93A9) in the catalog 90 or may determine new attributes from customer-provided relevance signals 110.

The catalog management system 100 may perform targeted catalog enrichment 150 that includes back-filling and consolidating the catalog data that customers may care about while reducing information overload. In some embodiments, some product categories can involve several hundred or more unique attributes. However, for a given product category, only a small number (e.g., thirty or fewer) attributes may be relevant to the average customer. For example, in an enriched catalog 190 resulting from catalog enrichment 150, items 92A1 through 92A9 in category 91A may be described using relevant attributes 193A, while items 92Z1 through 92Z9 in category 91Z may be described using relevant attributes 193Z. By performing catalog consolidation based (at least in part) on relevant attributes identification, the set of relevant attributes 193A for the category 91A may be smaller in size (e.g., in the number of attributes) than the various attributes 93A1 through 93A9 in the original catalog 90 for that category, while set of relevant attributes 193Z for the category 91Z may be smaller in size (e.g., in the number of attributes) than the various attributes 93Z1 through 93Z9 in the original catalog 90 for that category.

To address the challenge of scaling across domain schemas and attributes, the catalog management system 100 may perform schema matching 140 with limited or no annotated training data required to map additional attributes or schemas. In some embodiments, to address the challenge of context-specific attribute semantics, the catalog management system 100 may learn domain-specific language representations from textual descriptors 110 indicative of the relevance of various attributes to customers. For example, the textual descriptors 110 may be determined using user reviews 10, user questions and answers 20, search queries 30, vendor-sourced signals (e.g., product titles or descriptions comprising free-form or unstructured text), and so on. The textual descriptors may vary from category to category, e.g., such that textual descriptors 110A for category 91A may differ from textual descriptors 110Z for category 91Z. The catalog management system 100 may perform schema matching 140 with both scale and accuracy in enriching catalog knowledge with millions of attribute enumerations sourced from tens of thousands of source schemas. In some embodiments, the catalog management system 100 may reduce the burden of manual annotation by a large percentage (e.g., 75%) in comparison to prior approaches for schema matching.

Figure 7:
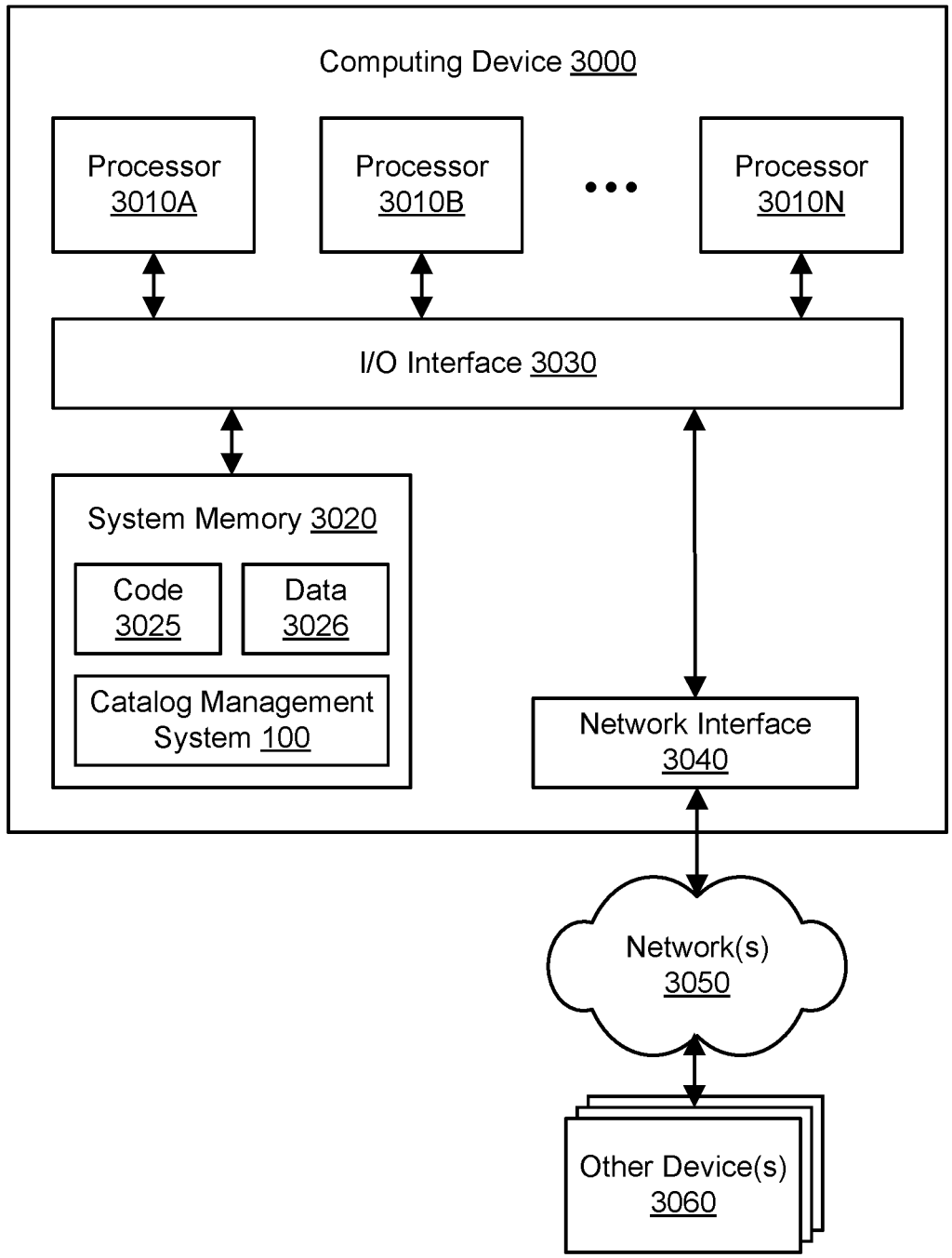
FIG. 7 illustrates an example computing device that may be used in some embodiments.

The catalog management system 100 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the catalog management system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees. In some embodiments, clients of the system 100 may represent different business entities than the entity that operates the system 100.

Components of the catalog management system 100 and its clients may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the catalog management system 100 may be implemented using computing resources of a provider network. The provider network may represent a network set up by an entity such as a company or a public-sector organization to provide one or more services (such as various types of network-accessible computing or storage) accessible via the Internet and/or other networks to a distributed set of clients. The provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. Aspects of the provider network may be hosted in the cloud, and the network may be termed a cloud-based provider network.

Figure 2:
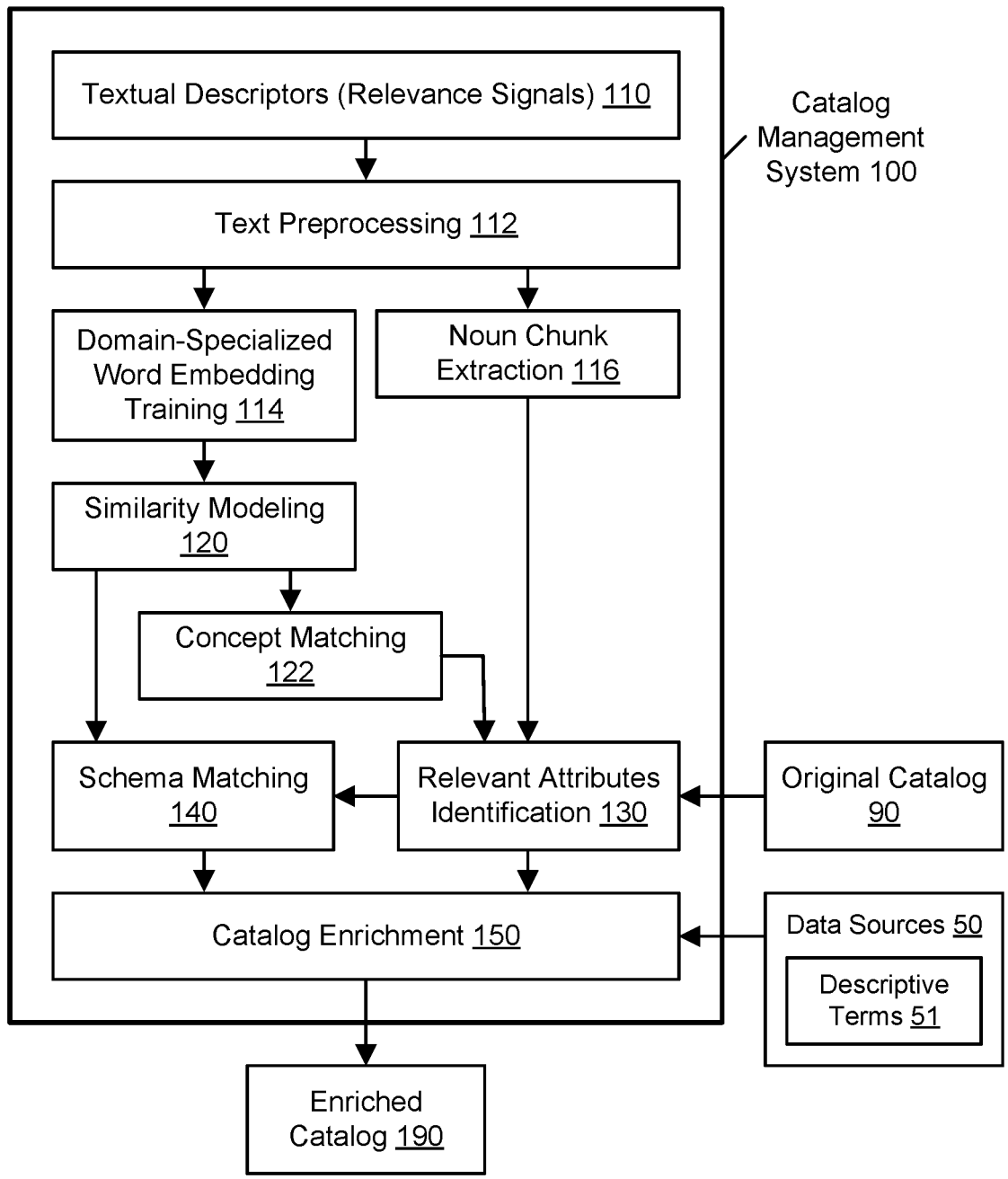
FIG. 2 illustrates further aspects of the example system environment for relevance-based schema matching for targeted catalog enrichment, including components for text preprocessing, domain-specialized word embedding training, similarity modeling, and concept matching, according to some embodiments.

FIG. 2 illustrates further aspects of the example system environment for relevance-based schema matching for targeted catalog enrichment, including components for text preprocessing, domain-specialized word embedding training, similarity modeling, and concept matching, according to some embodiments. To perform targeted catalog enrichment, the catalog management system 100 may include an unsupervised model for predicting relevancy 130 of product attributes. To perform targeted catalog enrichment, the catalog management system 100 may include a schema matching 140 model that matches relevant attributes across different schemas. In some embodiments, both the attribute relevancy model and the schema matching model may be based (at least in part) on an underlying model 120 for semantic attribute similarity. The model 120 for semantic attribute similarity may involve identifying and filtering salient candidate tokens 110 from a phrase that describes product attributes (e.g., sourced from either corpus data or from schema data) and then applying a language model to compute the semantic similarity between relevant tokens. In some embodiments, language models may be trained to distinguish semantics that differ based on the product category. For example, the token "hp" may represent horsepower in the context of lawnmowers or a brand name in the context of printers. Such relationships may be learned by training 114 word embeddings on a suitable product corpus. For example, the catalog management system 100 may use product descriptions 40 and customer reviews 10 from products grouped by product category in the target schema.

In some embodiments, knowledge of what attributes are relevant to customers for products within a certain category or context may allow the catalog management system 100 to prioritize attributes for enrichment through schema matching 140. However, inferring relevant attributes manually may be subjective and laborious when spanning a large number of diverse categories. The catalog management system 100 may approach computing saliency measures for product attributes as an information retrieval problem, where the prevalence and likelihood of corresponding concepts found in customer signals (e.g., customer reviews 10, customer Q&A 20, and/or search queries 30) is treated as a metric for attribute relevance. The catalog management system 100 may begin with a set of attributes 51 sourced from an incomplete and noisy catalog, and the system may match concepts found in the signals 51 to the attributes in the target schema that includes the customer-relevant attributes. The catalog management system 100 may then combine the frequencies of such matched concepts in the signals with heuristics to compute an overall relevancy score for each attribute in a product category.

The catalog management system 100 may augment or enrich a catalog by integrating multiple sources 50 for product data 51. In order to implement the targeted catalog enrichment, the catalog management system 100 may perform schema matching 140 that attempts to consolidate attributes across different schemas while addressing the problem of impedance mismatch. The catalog management system 100 may perform schema matching 140 based (at least in part) on the same or a similar underlying mechanism for semantic matching 122 of product concepts, but with application of a variant of attribute similarity that leverages sequence information to improve precision. The similarity metric derived from similarity modeling 120 may be augmented using ontology-specific normalization. The catalog management system 100 may build models to perform schema matching 140 through ranking and classification.

The catalog management system 100 may model semantic attribute similarity 120 while addressing challenges with product data. For example, product data may lack regular grammatical structure and may tend to be skewed towards technical and abbreviated language. In addition, word pairs with large edit distance (e.g., "centimeters" and "feet") may still refer to the same underlying concept. Different words within any given category may also represent the same concept. For example, "spring mattress" and "coil mattress" may describe the same type of mattress. To address these challenges, the catalog management system 100 may learn semantic word embeddings by training 114 on data 110 within specified product categories. The catalog management system 100 may leverage information such as customer product reviews 10 and product descriptions 40 as they are readily found on product listings and represent a rich source of natural text for training across many categories. In some embodiments, the catalog management system 100 may use the fastText library to handle both whole words and character n-grams that better match on abbreviated language common in product corpora.

The catalog management system 100 may determine similarities between an attribute and free text and also match an attribute from a source domain to its most similar attribute from a target domain. In the following discussion, the normalized embedding of word w may be denoted by $e_w$, and the set of attributes under reference domain Z may be denoted by $A_z=\{a_1^z, a_2^z, \ldots, a_n^z\}$ (where the symbol z may be dropped unless the domain under which attributes are defined is unclear). Each attribute $a_i$ may be defined as $a_i:=(k(a_i), V(a_i))$, where $k(a_i)$ is the attribute name and $V(a_i)$ is the set of unique attribute values which are referred to as enumerations. For example, an attribute that represents color can take the form a=("color", {"black", "brown", ..., "yellow"}). In some embodiments, the semantic similarity between two words $w_i$, $w_j$ may be defined as the cosine similarity of the corresponding word embeddings or more simply as the dot product of the normalized word embeddings, as defined using the following equation (1):

$$sim_w(w_i, w_j) = e_{w_i}^T e_{w_j}$$

In some embodiments, a string sequence can represent many different things, from attribute values to customer reviews or product titles (e.g., "travel backpack with USB port and silver straps"). Although measuring similarity over such sequences can be performed by aggregating words using mean embeddings, this approach may not represent product information well because it treats each word equally in addition to discarding word order. For example, using this approach, sequences like "navy blue backpack, silver straps" and "silver backpack, navy blue straps" would have the same mean embedding but a completely different meaning. In some embodiments, the catalog management system 100 may take word importance and structure (e.g., word order) into account.

In some embodiments, the catalog management system 100 may determine the similarity of each token in sequence $s_x$ against its best matching token in sequence $s_y$ weighted by the statistical measure tf-idf (term frequency—inverse document frequency). This technique may have increased entropy and may be used for relevance computation 130. The similarity between two sequences $s_x$, $s_y$ may be defined using the following technique:

Initialization: $sim_s(s_x, s_y)=0$, $norm_s(s_x, s_y)=0$
while $s_x \neq \emptyset$ do $$(w_i^*, w_j^*) \leftarrow \underset{w_i \in s_x, w_j \in s_y}{\operatorname{argmax}} sim_w(w_i, w_j)$$

$sim_s(s_x,s_y) += \text{tf-idf}(w_i^*) \cdot \text{tf-idf}(w_j^*) \cdot sim_w(w_i^*,w_j^*)$
$norm_s(s_x,s_y) += \text{tf-idf}(w_i^*) \cdot \text{tf-idf}(w_j^*)$
Remove $w_i^*$ from $s_x$, remove $w_j^*$ from $s_y$
end while
$sim_s(s_x,s_y) \neq norm_s(s_x,s_y)$,
where $sim_w(w_i,w_j)$ is defined in equation (1), and tf-idf($w_i^*$), tf-idf(w) is the tf-idf score of word w. This technique may compute the similarities of all token pairs between $s_x$, $s_y$. This technique may keep the largest similarity and remove the corresponding tokens from $s_x$, $s_y$. This technique may continue by keeping the second largest similarity, while removing the corresponding tokens from $s_x$, $s_y$ until it exhaustively removes all tokens from $s_x$.

In some embodiments, the catalog management system 100 may consider the harmonic mean of the similarities of all subsequences starting from the beginning of the sequences. This technique may be biased towards more strict matching across text fragments and may be used for precise schema matching 140. This technique may consider contiguous subsequences of each sequence and may measure similarity as the harmonic mean of all position-wise word similarities. In order to encode sequential information crucial for matching attributes, this technique may represent a departure from bag-of-words (BOW). This technique may be termed Maximum Contiguous Subsequence Similarity (MCSS) and may be defined using the following equation (2):

$$sim_s(s_x, s_y) = \gamma(s_x, s_y) \cdot \max_{s_x', s_y'} \frac{n}{\sum_{i=1}^n sim_w(s_x'[i], s_y'[i])^{-1}},$$

where $n=\min(|s_x|, |s_y|)$ is the number of words in the shorter sequence, and $s_x'$, $s_y'$ are n-length subsequences of $s_x$, $s_y$ respectively. The expression $(s_x,)=\min(1, |s_x|/|s_y|)$ may penalize similarity when the enumeration sequence from source domain x is shorter than the one from target domain y. The MCSS technique may use the harmonic mean for aggregation to favor cases where similarity is consistently high across all words in the sequence. The MCSS technique may compute similarity between two enumerations by comparing their most similar text fragments equal in length to the shorter enumeration. For example, given $s_x$="Length: 15 centimeters diagonal" and $s_y$="18 cm", the MCSS technique may compare text fragments and produce the maximum position-wise similarity (in this case, "15 centimeters").

In some embodiments, to define similarity between two attribute enumeration sets, the catalog management system 100 may take the weighted average MCSS similarity across all enumeration pairs in sets $V(a_x)$, $V(a_y)$, as defined using the following equation (3):

$$sim_V(V(a_x), V(a_y)) = \frac{\sum_{s_x} \sum_{s_y} p(s_x) p(s_y) sim_s(s_x, s_y)}{\sum_{s_x} \sum_{s_y} p(s_x) p(s_y)},$$

where $p(s_z)$ is the probability that attribute $a_z$ has value $s_z$ in a given product in schema z. The attribute similarity may then be determined as the harmonic mean of name and enumeration similarities, as defined using the following equation (4):

$$sim_a(a_x, a_y) = \frac{2}{sim_s(k(a_x), k(a_y))^{-1} + sim_V(V(a_x), V(a_y))^{-1}}$$

In some embodiments, the catalog management system 100 may approach the computation of attribute relevance as an information retrieval problem. The catalog management system 100 may be implemented with the assumption that product concepts that contribute to customer interest are co-located in customer signals and catalog data for a particular product category with higher frequency than across arbitrary products. In some embodiments, a product class may include a set of products that share the same form and utility. Let the domain $z=\{z_1, z_2, \ldots, z_k\}$ represent a set of products for a product class z, and let $A_z=\{a_1^z, a_2^z, \ldots, a_n^z\}$ denote the set of attributes that are applicable to all products in the class. In some embodiments, for all products in the class, there must exist a valid enumeration value set $V(a_1^z)$, for all attributes $a_1^z$. A product class may also include optional attributes $A_z'$, and a coherent product class is one where $\|A_z\| \gg \|A_z'\|$. The terms product class and product category may be used interchangeably. The problem of identifying the ontology of product classes and the corresponding set of applicable attributes may be approximated by inferring only the relevant attributes that contribute to customer interest. The catalog management system 100 may assume that the class of products can be approximated from an existing noisy catalog, and the system may aggregate a superset of candidate attributes $A_z'$ that may or may not be applicable to that class z. Given this initial approximation from noisy catalog data, the catalog management system 100 may then aim to compute a relevancy score for attributes with respect to some relevance context c as defined by the customer signals. The catalog management system 100 may then rank candidate attributes in $A_z'$. Very low ranking attributes may be considered noise to be removed, and low ranking attributes may be considered not relevant.

Given a catalog 90 with a noisy schema definition and both incomplete and noisy product data, the catalog management system 100 may estimate a probability distribution $(a_i)$ from source signals corresponding to relevance context c. The catalog management system 100 may estimate the likelihood that $a_i$ is a relevant attribute by computing the relative probabilities of finding concepts corresponding to attributes $a_i$ in the source signals (associated to the product class z and the relevance context c). The corresponding likelihood of each concept fragment found the corpus may then provide the relevance scores for the attributes, as defined in the following equation (5):

$$p(a_i | z, c) = \frac{\sum_{j,x} p(c_{j,x} | a_i, z) * p(a_i | z)}{\sum_{j,x} p(c_{j,x} | z)},$$

where $c_{j,x}$ is a text fragment x from source signals j corresponding to relevance context c and $p(c_{j,x}|a_i,p)$ is the probability of the text fragment given attribute $a_i$ and product class z. The likelihood for a text fragment given the attribute may be estimated as the likelihood that both the text fragment and the attribute correspond to the same concept s (and thus have semantic similarity). This likelihood may be computed using the semantic similarity metrics described for sequence similarity, e.g., equation (2). In some embodiments, the probability of an attribute $a_t$ given a product class z may be inferred from statistics in catalog data. In some embodiments, scores may be normalized across the corpus.

In some embodiments, the catalog management system 100 may also compute attribute relevance scores by normalizing each signal separately using the highest scoring attribute for that signal. This technique may allow the catalog management system 100 to combine scores from different signals while avoiding scenarios where one dominant customer overshadows all of the others. Once relevance scores have been computed, the catalog management system 100 may rank the attributes according to their relevance. A threshold to the maximum number of relevant attributes that are desired for schema enrichment may be determined in conjunction with a threshold for the minimum relevance score. In some embodiments, these thresholds may be empirically determined by evaluating results for several hundred product classes.

In some embodiments, the catalog management system 100 may perform preprocessing 112 of corpora and catalog data. For example, the corpus may be segmented, tagged by part-of-speech (POS) tags, lemmatized, have stop words removed, and have units and numbers normalized. In some embodiments, POS tagging may be excluded on schema data where the words found in a semi-structured model generally do not exhibit grammatical structure. Bigrams and trigrams (e.g., screen size→screen size) may be automatically detected based on high-frequency co-located tokens. An unsupervised n-gram phrase detector may be trained based upon a continuous skip-gram model. The same data corpora 110 used to train 114 the word embeddings may be used as input, and a low score threshold (e.g., 0.25) may be configured to encourage phrase formation. Tokenization based on phrase detection may produce n-grams of similar length from customer signals, manufacturer/vendor values, and catalog values. Distributional differences may then be accounted for by measuring semantic similarity against these phrases as described herein. In some embodiments, the same phrase model may be applied on all domains to avoid introducing bias. Product concepts found in the corpus 110 may tend to be nouns. Using a component for noun chunk extraction 116, a histogram dictionary may be constructed that includes noun chunks extracted from the data after POS tagging is performed. Given the nature of the corpus 110, this dictionary may predominantly include product facts. This dictionary may be used as the source of text fragments $c_j$, for computing relevance in equation (5).

The catalog management system 100 may perform schema matching 140 based (at least in part) on attribute ranking and classification. In some embodiments, given a set of relevant attribute candidates $A_y$ representing the target schema, the catalog management system 100 may perform attribute schema matching 140 by selecting attributes from the target schema that best represent a given source attribute $a_x$ for a given product category y. The target schema may include or be associated with an index of relevant attribute candidates by product category, e.g., as produced using relevant attributes identification 130 discussed herein. In some embodiments, on average, the catalog management system 100 may produce roughly $|A_y|=30$ relevant attribute candidates for a given product category. In some embodiments, the average product category may include hundreds of attributes.

In some embodiments, with millions of potential source schemas matching to thousands of target attributes for a large catalog, manual schema matching for attributes may be prohibitively time-consuming. The catalog management system 100 may perform such schema matching 140 with highly precise matching in order to maintain quality catalog data. The catalog management system 100 may perform schema matching 140 at scale without compromising precision. Given the potentially large number of source schemas, the catalog management system 100 may perform schema matching 140 without relying on training models specific to a given source.

Using an attribute ranking approach, the model may produce schema matching suggestions to reduce the cost of human annotation in a semi-automated system. The model output may include an ordering over $A_y$ for each source attribute, of which the top suggested attributes are considered for final matching. Using an attribute classification approach, models may be built to directly classify common attributes (or attribute types) across product categories. In both approaches, the catalog management system 100 may account for challenges such as addressing noise or variability by building a common approach to normalize enumerations and extract phrases that are comparable across various schemas.

In some embodiments, product attribute data may be characterized by a relative lack of regular grammatical structure. This lack of structure may limit the potency of word embeddings that are primarily trained on natural language expressions. Additionally, word meanings in the attribute value space may tend to be skewed towards technical and abbreviated language. For example, in a product catalog setting, the word "ton" may be far more likely to refer to a specific unit of measure than a looser vernacular expression. In some embodiments, catalog data may include a large frequency of high-precision numerical enumerations. Small differences in numerical value may not be captured well by traditional natural language embeddings, which tend to underestimate similarities in enumerations such as "5.4 inches" and "5.8 inches." To address such challenges, the catalog management system 100 may use a word ontology-based approach to normalize numeric enumerations with units. For identifying unit synonyms, the catalog management system 100 may leverage the WordNet lexical database that contains ontological word relationships as well as hand-crafted synonyms. Using WordNet, the catalog management system 100 may implement a reverse index of synonyms for accepted units in the catalog, relying on the ontology to restrict synonym sets to units of measure only (such as hyponyms of definite_quantity.n.01). This index of unit synonyms may be augmented with symbols for common units (such as " for inches).

In some embodiments, the catalog management system 100 may implement a normalization heuristic that uses regular expression (regex) matching for detecting numeric enumerations followed by potential units. If unit synonyms are matched, then the catalog management system 100 may normalize the unit to the canonical representation in the target catalog. The catalog management system 100 may round numeric values to one significant figure before converting to word representations.

In some embodiments, the catalog schema may include large distributional differences in length and structure between source attribute enumerations and attribute enumerations. These differences may arise due to varying degrees of strictness in schema datatypes, e.g., where the source schema may represent a given attribute as TEXT (or VARCHAR) but the corresponding attribute in the target is modeled with a compound datatype. The catalog management system 100 may account for this by adopting a similarity metric to consider relevant subsequences in both domains. During normalization, the catalog management system 100 may identify comparable phrases to be grouped together as n-grams (as discussed herein with respect to preprocessing). For example, the similarity of the phrases "diagonal" and "corner to corner" may be measured.

The catalog management system 100 may perform schema matching 140 using a ranking approach. While it may be possible to estimate similarity on sets of phrases, taking the mean similarity with a bag-of-words approach may discard structure that is important for characterizing enumerations. One such example is a product dimensions attribute, which is often depicted as an ordered tuple of numeric values (e.g., "9.9 in.×6.8 in.×0.3 in."). The catalog management system 100 may implement a robust similarity metric for schema matching that preserves such structure. As discussed herein, the catalog management system 100 may use the MCSS metric as defined using equation (2) that models enumerations as ordered sequences. The catalog management system 100 may choose the most relevant subsequences to score enumeration similarity, with the intuition that enumerations of the same attribute tend to have at least one highly similar ordered subsequence of phrases (e.g., a numeric quantity followed by a unit of measure). The MCSS metric may be robust to distributional differences across schemas (e.g., in length, additional metadata, etc.).

The catalog management system 100 may perform schema matching 140 in an unsupervised manner by computing attribute similarity $sim_a(a_x, a_y)$ for a given source attribute $a_x$ and any candidate target attribute $a_y$ based on the product category of $a_x$. Target attributes $a_y$ that share a high similarity may be surfaced as ranked suggestions. Taking such a schema-independent approach to schema matching 140 may allow the catalog management system 100 to generalize to match new schemas rapidly. In some embodiments, rankings may be surfaced for human review for semi-automated matching, or the rankings may be used as input to a fully automated schema matching system. In some embodiments, while ranking may generalize well to unseen source schemas and attributes, it may require human judgment to select final schema matches. In some embodiments, the catalog management system 100 may remove or reduce the manual burden of matching attributes with models that classify with high precision across schemas and product classes. The catalog management system 100 may perform supervised classification of attributes in a setting where the total number of labelled matches is smaller than the number of possible attribute labels. In some embodiments, the product attribute frequency may follow a power-law distribution, as may the distribution of attribute enumerations. Leveraging these observations, the catalog management system 100 may extend attribute similarity to construct simple binary classification heuristics for the most frequently occurring attributes.

For a given target attribute $a_y$, a high-quality enumeration set $V(a_y)$ may be constructed by either selecting the most frequently occurring enumerations in the catalog (after ontology-based normalization described herein) or by leveraging domain experts to provide sample enumerations. This approach may reduce risks due to noise and may boost precision at the cost of losing recall. Given a restricted enumeration set $V(a_y)$, the catalog management system 100 may then perform binary classification by simply thresholding on attribute similarity $sim_a$ as defined in equation (4), where the threshold may be a hyperparameter than can be optimized per-attribute during evaluation. This approach for schema matching may perform particularly well for common product attributes by meeting precision bars while classifying with reasonable recall.

In some embodiments, the catalog management system 100 may perform classification using supervised learning based (at least in part) on attribute datatypes in the catalog schema. This approach may benefit from the number of attribute types being much lower than the number of distinct attributes, thus reducing size of the target label space. In some embodiments, a binary classifier may be trained for attributes describing quantities (e.g., the number of pieces in a puzzle). Training data may be constructed from historical schema matches by labelling source attributes with a 1 if they match to quantity attributes or 0 otherwise. In some embodiments, features may be constructed that concatenate mean embeddings for product category, name, and enumeration, along with positional features. The mean embeddings may be passed to a logistic regression model that learns to distinguish attributes of the quantity type. In some embodiments, this model may be applied to classify attributes according to the following procedure that leverages the relevant attributes candidate generation along with name similarity as expressed in equation (2):

Require: t: name similarity threshold
for $a_x \in A_x$ do
   if ClassifyQuantity($a_x$) then
      $A_y \leftarrow$ RelevantAttributes($a_x$)[Type=Quantity]

$$a_y^* \leftarrow \underset{a_y \in \mathcal{A}_y}{\operatorname{argmax}}\ sim_s(k(a_x), k(a_y))$$

Classify $a_y^*$ as $sim_s(k(a_x),k(a_y^*))>t$
   end if
end for

Figure 3:
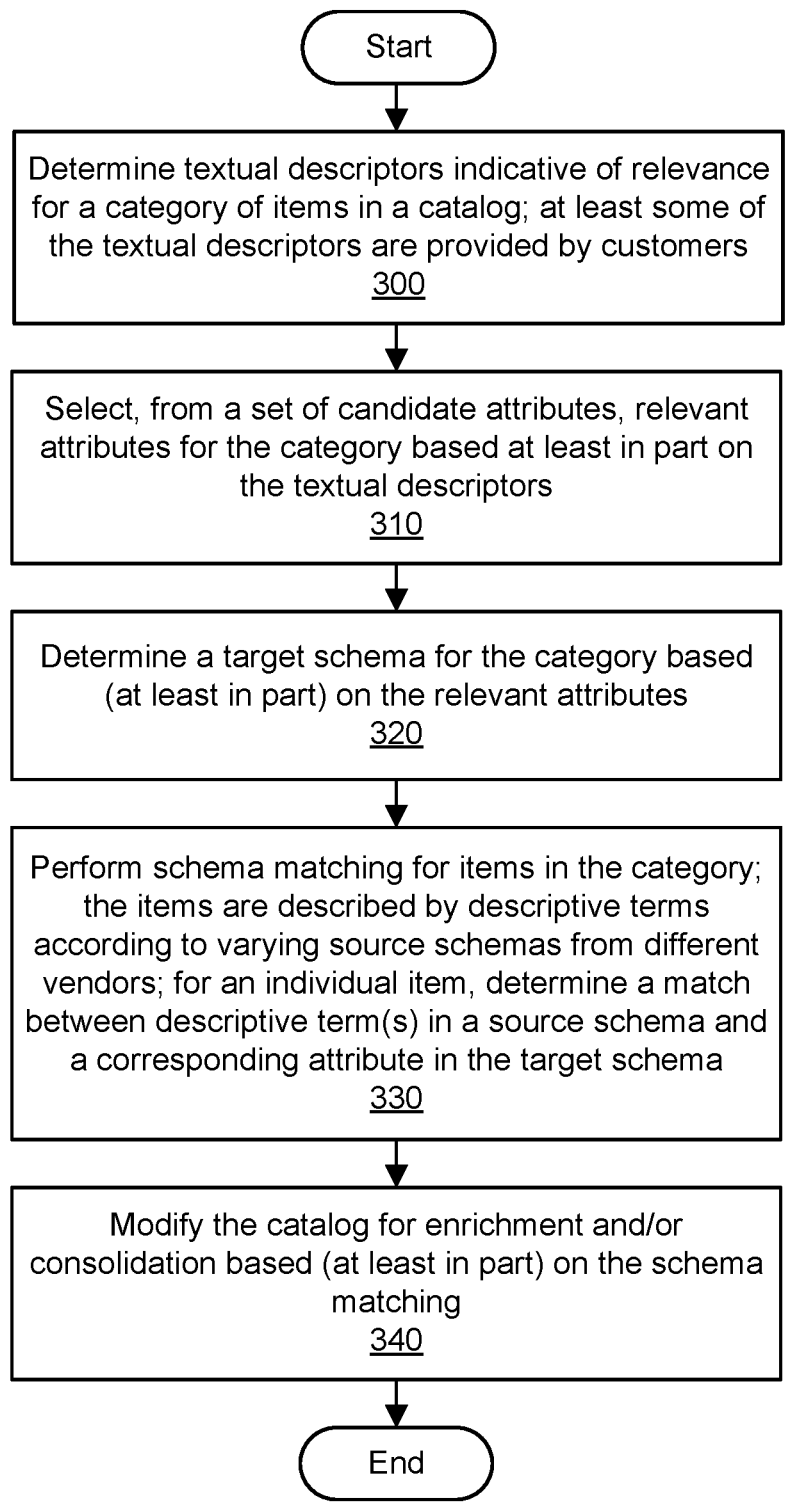
FIG. 3 is a flowchart illustrating a method for relevance-based schema matching for targeted catalog enrichment, according to some embodiments.

FIG. 3 is a flowchart illustrating a method for relevance-based schema matching for targeted catalog enrichment, according to some embodiments. As shown in 300, a plurality of textual descriptors may be determined for a category of items (e.g., products) in a catalog. The catalog may include products (e.g., goods and services) offered through an Internet-accessible store. The textual descriptors may be indicative of the relevance to users (e.g., customers) of particular attributes for the category. At least some of the textual descriptors may be provided by users (e.g., customers) of products in the catalog. For example, customer reviews may include words that tend to indicate which attributes are important to customers. As another example, customer question-and-answer elements may include words that tend to indicate which attributes are important to customers. As a further example, search queries may include words that tend to indicate which attributes are important to customers. In some embodiments, at least some of the textual descriptors may be provided by vendors of products in the catalog. For example, product titles may include words that tend to indicate which attributes are important to customers. As another example, product descriptions may include words that tend to indicate which attributes are important to customers.

As shown in 310, a set of relevant attributes for the category may be selected from a larger set of candidate attributes for the category. The relevant attributes may be selected based (at least in part) on analysis of the textual descriptors indicative of attribute relevance. For example, analysis of the textual descriptors may determine that customers frequently discuss the color and dimensions of items in a smartphone category but very infrequently discuss the shipping weight of the same items. The relevant attributes may include attributes for item color and item dimensions but not item shipping weight. To select the relevant attributes, candidate attributes may be assigned scores and ranked according to those scores. In some embodiments, the candidate attributes may be determined based (at least in part) on existing attributes for items in the category of the catalog. In some embodiments, the candidate attributes may be determined based (at least in part) on attribute names provided by vendors of items in the category. At least some of the candidate attributes may be excluded from the set of relevant attributes. The analysis of the textual descriptors may include steps for text preprocessing 112, domain-specialized word embedding training 114, noun chunk extraction 116, similarity modeling 120, and concept matching 122.

As shown in 320, a target schema may be determined for the category based (at least in part) on the relevant attributes. The target schema may include the relevant attributes and exclude other candidate attributes. For example, in the smartphone category, the target schema may include attributes for item color and item dimensions but not item shipping weight. In some embodiments, the target schema may include only a small percentage of the attributes provided by vendors for the category. For example, the target schema may include about thirty attributes, while the candidate attributes may number in the hundreds. Any suitable threshold may be used to select relevant attributes from the ranking of attributes. In some embodiments, the size of the set of relevant attributes for a category-specific target schema may be determined according to a default value (e.g., thirty). In some embodiments, the size of the set of relevant attributes for a category-specific target schema may be determined according to a category-specific priority, e.g., such that categories deemed to be of a higher priority may have more attributes in their target schemas than categories of a lower priority. In some embodiments, the size of the set of relevant attributes for a category-specific target schema may be determined according to one or more performance goals or computing resource usage goals, e.g., such that the analysis discussed with reference to 310 may be assigned a greater amount of computing resources for some categories than for others. As a consequence of assigning different amounts of computing resources for the relevant attribute analysis for different categories, the number of relevant attributes may differ among those categories.

As shown in 330, schema matching may be performed for items in the category. The items may be associated with different descriptive terms, and those terms may be expressed according to a wide variety of source schemas. The source schemas may be associated with different vendors or other sources of product information. The source schemas may be reflected in item entries in the existing catalog prior to performing targeted catalog enrichment as described herein. The source schemas may be inconsistent. For example, one vendor may indicate a weight for an item's size, while another vendor may indicate dimensions for an item's size. As another example, one vendor may indicate an item's dimensions using metric units, while another vendor may indicate an item's dimensions using Imperial units. As yet another example, one vendor may omit an attribute for one item, while another vendor may include that attribute for a similar item. For an individual item, schema matching may include determining a correspondence or match between one or more of the descriptive terms in a source schema and a corresponding attribute in the target schema. For example, the schema matching may match the attribute name "item size" (with an attribute value expressed in units of weight) to a relevant attribute "item weight" in the target schema. As another example, the schema matching may match the attribute name "item size" (with one or more attribute values expressed in units of length) to a relevant attribute "item dimensions" in the target schema. Units in the descriptive terms may be normalized to enable schema matching. The schema matching may include scoring or ranking the strength of potential matches between one or more of the descriptive terms in a source schema and individual attributes in the target schema. The ranking may be based (at least in part) on a word order of the one or more of the descriptive terms. The schema matching may be based (at least in part) on steps for text preprocessing 112, domain-specialized word embedding training 114, noun chunk extraction 116, similarity modeling 120, and concept matching 120.

As shown in 340, the catalog of items may be modified based (at least in part) on the schema matching. The catalog may be modified to perform enrichment, augmentation, and/or consolidation. For example, the number of attributes for a particular item may be consolidated such that only the customer-relevant attributes remain in the catalog. As another example, units may be normalized, e.g., such that similar items are described with comparable measurements. In some embodiments, the catalog may be modified to alter the attribute names and/or attribute values for existing items, e.g., using category-specific target schemas. In some embodiments, the catalog may be modified to add attribute names and attribute values for new existing items, e.g., using category-specific target schemas. Enrichment, augmentation, and/or consolidation may improve the experience of catalog users (e.g., customers) by facilitating easier browsing, searching, and comparison of items.

Figure 4:
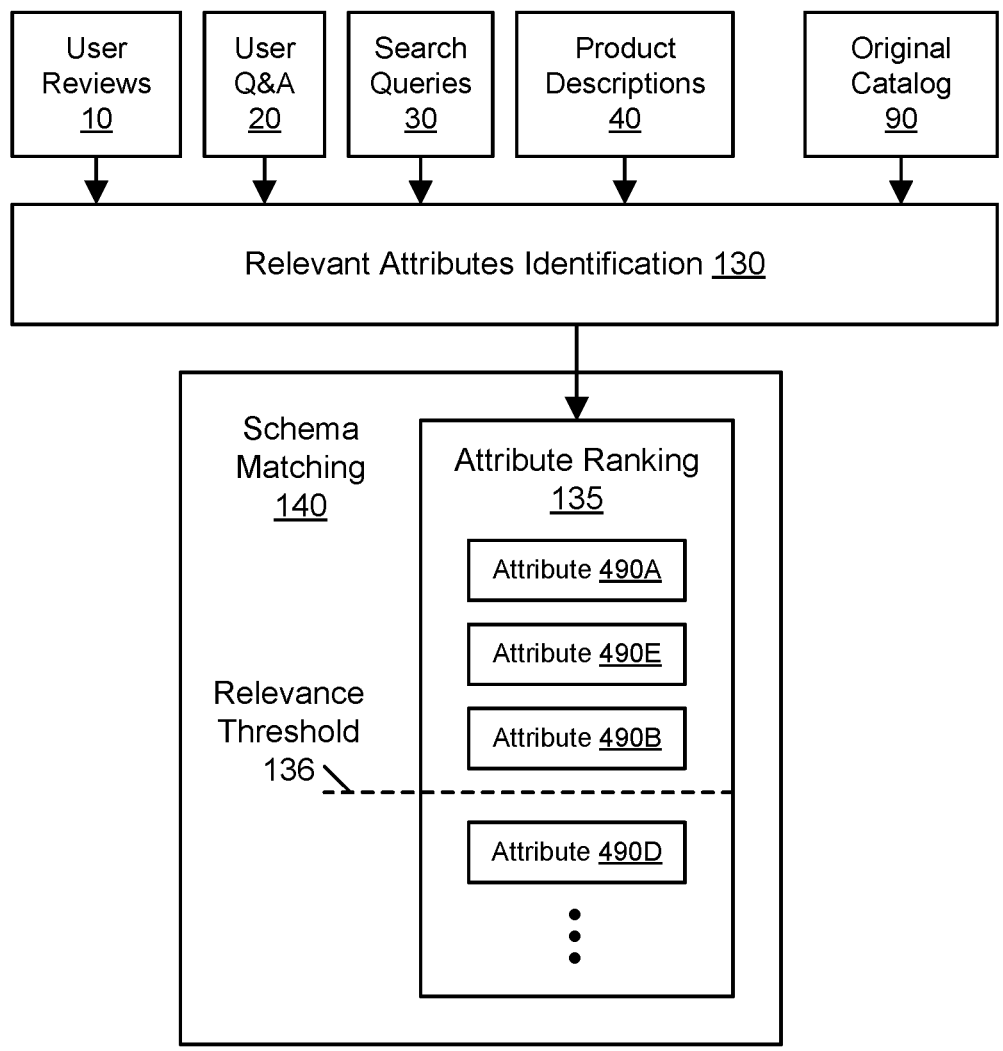
FIG. 4 illustrates further aspects of the example system environment for relevance-based schema matching for targeted catalog enrichment, including attribute relevance ranking for a category, according to some embodiments.

FIG. 4 illustrates further aspects of the example system environment for relevance-based schema matching for targeted catalog enrichment, including attribute relevance ranking for a category, according to some embodiments. Items in the catalog 90 may be associated with different descriptive terms (e.g., attributes having attribute names and attribute values), and those terms may be expressed according to a wide variety of source schemas. The system 100 may determine a target schema for a given category 91A that represents the attributes deemed most relevant to customers. As shown in FIG. 4, a set of relevant attributes for the category 91A may be determined. For example, relevant attributes may be determined using relevance signals 110 such as user reviews 10, user Q&A 20, search queries 30, product descriptions 40, and so on. As another example, relevant attributes may be determined using existing attributes in the catalog 90. The relevant attributes identification 130 may be performed based (at least in part) on analysis of the textual descriptors indicative of attribute relevance. For example, analysis of the textual descriptors may determine that customers frequently discuss the color and dimensions of items in a smartphone category but very infrequently discuss the shipping weight of the same items. To identify the attributes most relevant to customers of the category 91A, candidate attributes may be assigned scores by the relevant attributes identification 130. In some embodiments, schema matching 140 may include ranking the relevant attributes according to those scores using a component for attribute ranking 135. In some embodiments, attributes from one particular source schema may be scored and ranked, and that ranking may be used to drive the schema matching 140 for the category 91A.

Any suitable relevance threshold 136 may be used to divide the more relevant attributes (e.g., attributes 490A, 490E, and 490B) from the less relevant attributes (e.g., attribute 490D) in the ranking 135 of candidate attributes. In some embodiments, the size of the set of relevant attributes for a category-specific target schema may be determined according to a default value (e.g., thirty). In some embodiments, the size of the set of relevant attributes for a category-specific target schema may be determined according to a category-specific priority, e.g., such that categories deemed to be of a higher priority may have more attributes in their target schemas than categories of a lower priority. In some embodiments, the size of the set of relevant attributes for a category-specific target schema may be determined according to one or more performance goals or computing resource usage goals, e.g., such that the relevant attributes identification 130 and/or schema matching 140 may be assigned a greater amount of computing resources for some categories than for others. As a consequence of assigning different amounts of computing resources for the relevant attribute analysis for different categories, the number of relevant attributes may differ among those categories.

Figure 5:
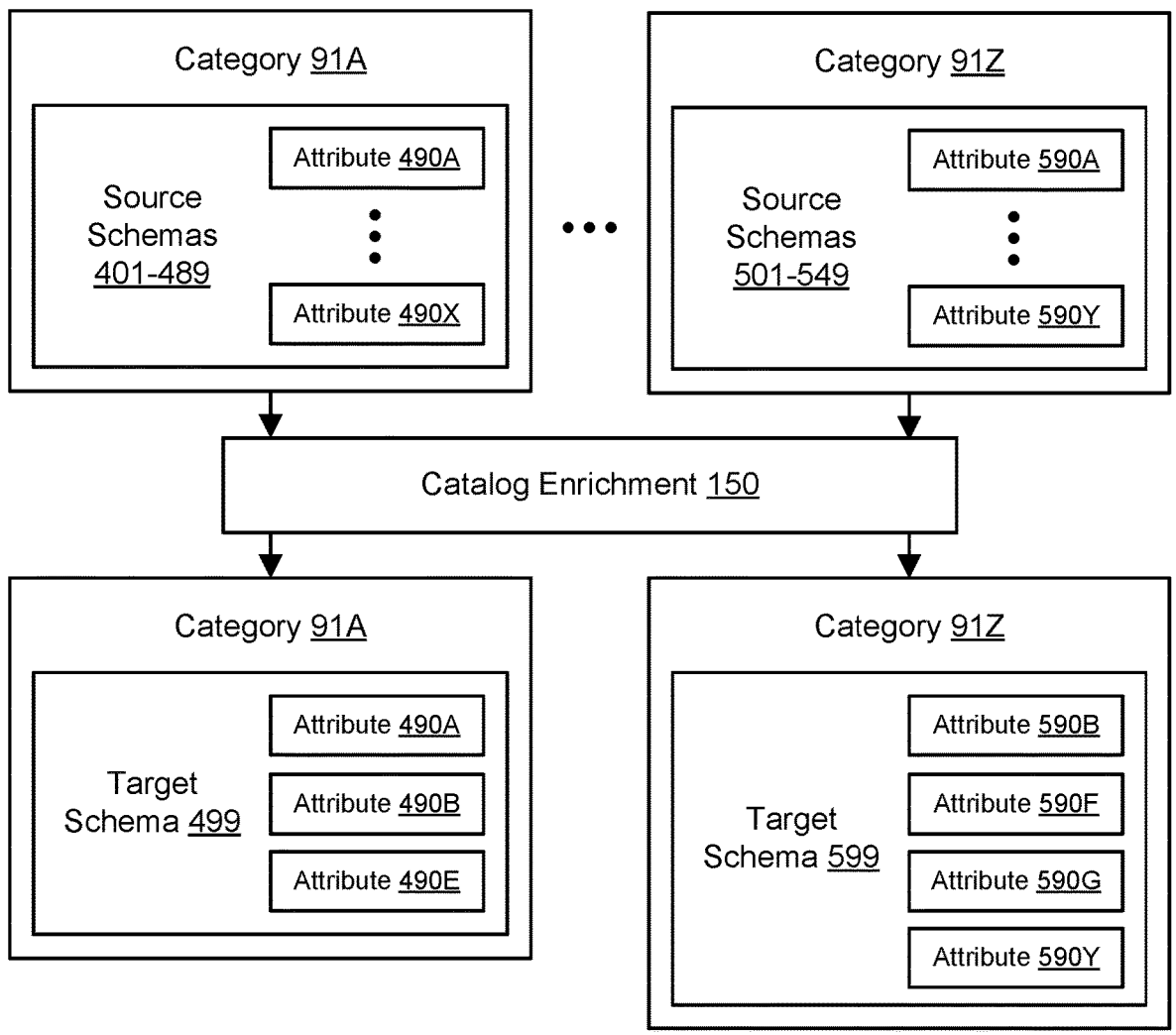
FIG. 5 illustrates further aspects of the example system environment for relevance-based schema matching for targeted catalog enrichment, including selection of different relevant attributes for different categories of the catalog, according to some embodiments.

FIG. 5 illustrates further aspects of the example system environment for relevance-based schema matching for targeted catalog enrichment, including selection of different relevant attributes for different categories of the catalog, according to some embodiments. Tasks such as relevant attributes identification 130 and schema matching 140 may be performed in a category-specific or domain-specific manner, e.g., such that outputs of those tasks may vary by category. For example, one category 91A may be associated with source schemas 401-489 in the catalog 90, and those source schemas 401-489 may include various candidate attributes 490A-490X. However, another category 91Z may be associated with different source schemas 501-549 in the catalog 90, and those source schemas 501-549 may include a different set of candidate attributes 590A-590Y. The catalog enrichment 150 may produce different results for the two categories 91A and 91Z. For example, a target schema 499 for category 91A may include three attributes 490A, 490B, and 490E, while the target schema 599 for category 91Z may include four attributes 590B, 590F, 590G, and 590Y. The target schema 499 may include the relevant attributes and exclude other candidate attributes based (at least in part) on the relevance-based attribute ranking 135. For example, the target schema 499 may include higher-ranking attributes 490A, 490E, and 490B but exclude lower-ranking attributes such as attribute 490D. In some embodiments, the target schema 499 may include about thirty attributes, while the candidate attributes may number in the hundreds. The category-specific output of the system 100 may further improve the user experience by focusing on different attributes that are most relevant to users for different categories of items (e.g., products).

Figure 6:
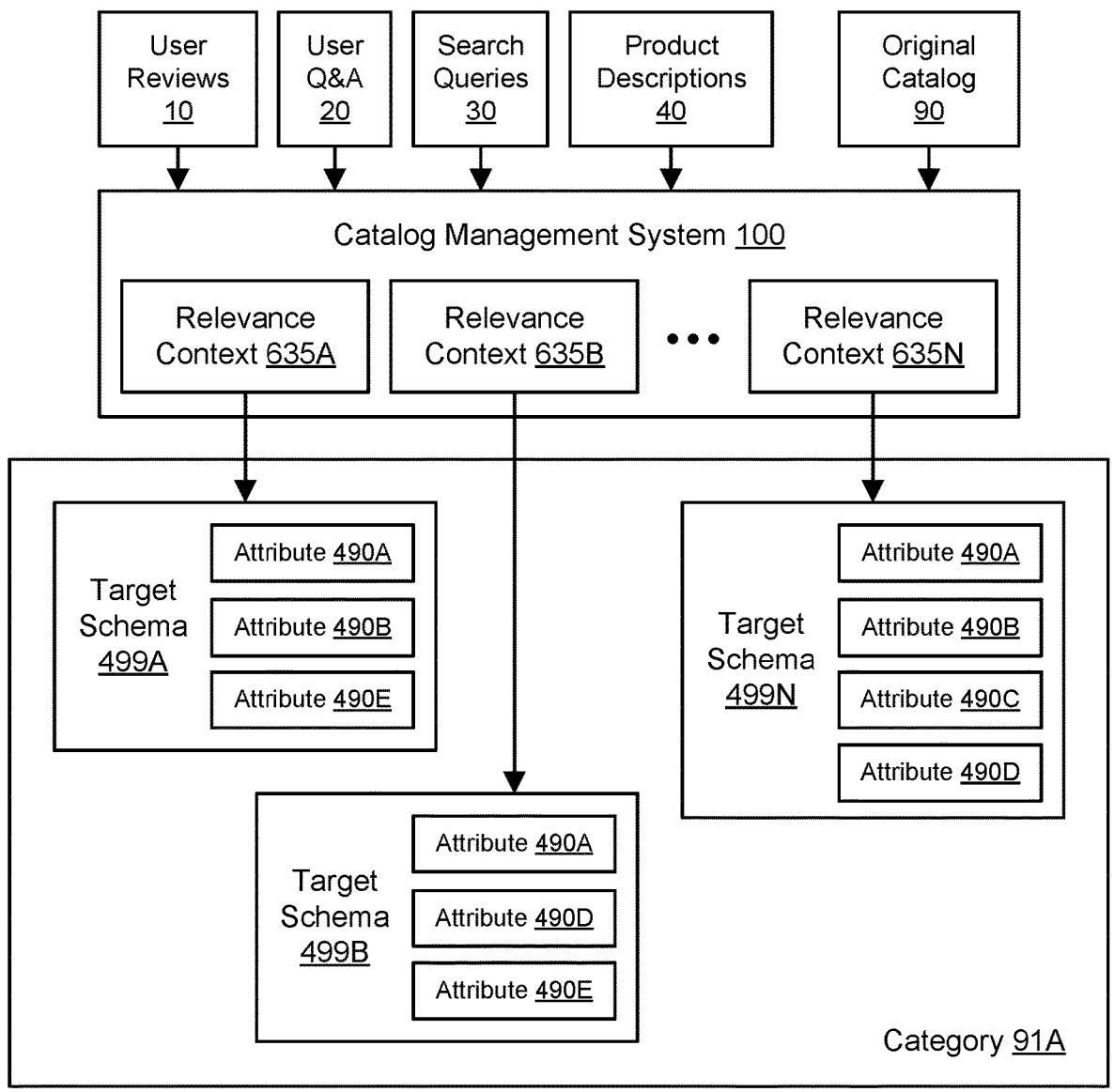
FIG. 6 illustrates further aspects of the example system environment for relevance-based schema matching for targeted catalog enrichment, including selection of different relevant attributes for different relevance contexts, according to some embodiments.

FIG. 6 illustrates further aspects of the example system environment for relevance-based schema matching for targeted catalog enrichment, including selection of different relevant attributes for different relevance contexts, according to some embodiments. In some embodiments, the catalog management system 100 may determine relevance scores for one or more relevance contexts. For example, the catalog management system 100 may determine one set of relevant attributes or a ranking of relevance for one relevance context 635A, another set of relevant attributes or a ranking of relevance for another relevance context 635B, and yet another set of relevant attributes or a ranking of relevance for yet another relevance context 635N. The relevant attributes for one context may tend to overlap with the relevant attributes for another context, but the set of relevant attributes may vary at least somewhat. For example, for the relevance context 635A, the system 100 may determine a target schema 499A with one set of relevant attributes, e.g., attributes 490A, 490B, and 490E. For the relevance context 635B, the system 100 may determine a target schema 499B with another set of relevant attributes, e.g., attributes 490A, 490D, and 490E. For the relevance context 635N, the system 100 may determine a target schema 499A with yet another set of relevant attributes, e.g., attributes 490A, 490B, 490C, and 490D.

The individual relevance contexts 635A-635N may represent different use cases for relevance scores or rankings. For example, a product comparison context may relate to attributes relevant for comparing products for purchasing decisions, where the source signals (textual descriptors indicative of relevance to customers) may include customer reviews, customer Q&A, and vendor product descriptions. As another example, a product title context may relate to attributes relevant for display on titles, where the source signals (textual descriptors indicative of relevance to customers) may include vendor product titles. As yet another example, a product discovery context may relate to attributes relevant for product search and filtering, where the source signals (textual descriptors indicative of relevance to customers) may include customer search queries. Signals like customer reviews and Q&A may reflect important product features for making product purchasing decisions. Additionally, vendors and manufacturers may emphasize what they believe customers care about in their product descriptions and overviews. Customer reviews and product descriptions may also be used for training 114 of a word embeddings model.

In some embodiments, the catalog management system 100 may determine an overall relevance score based (at least in part) on the relevance scores for two or more individual relevance contexts. The overall relevance may itself correspond to a broader relevance context. In some embodiments, for a candidate attribute, the overall relevance score may be determined as a uniform average of two or more of the individual relevance scores. The overall relevance context may be used to drive schema enrichment for a catalog. However, the catalog management system 100 may prioritize catalog enrichment for other aspects of relevancy. Relevant attributes for each context may be labeled in the target catalog schema for their contextual usage, such as for determining a display priority customers or for other system workflows.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-

3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, program code and/or data usable to implement the catalog management system 100 may be stored in system memory 3020.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a catalog management system comprising one or more processors and one or more memories to store computer-executable instructions that, when executed, cause the one or more processors to:
      determine a plurality of textual descriptors associated with a category of items in a catalog, wherein the textual descriptors indicate item attributes of the category of items, wherein at least a portion of the textual descriptors include customer signals of items in the category provided by users of the catalog;
      determine, using a similarity model for the category trained in an unsupervised machine learning process, attribute relevance metrics for individual ones of the item attributes based at least in part on the customer signals;
      select, based at least in part on the attribute relevance metrics, a plurality of relevant attributes for the category of items from among the item attributes, wherein the selection of the relevant attributes reduces a number of the item attributes indicated in the textual descriptors;
      determine a target schema for the category of items in the catalog based at least in part on the plurality of relevant attributes, wherein the reduction of the number of item attributes reduces a storage size of the catalog used to store the target schema; and
      modify the catalog based at least in part on schema matching for a plurality of items in the category, wherein the plurality of items are associated with descriptive terms from a plurality of data sources and expressed according to a plurality of source schemas, wherein, for an individual item of the plurality of items, the schema matching uses the similarity model to determine a match between one or more of the descriptive terms in an individual one of the source schemas and a corresponding attribute in the target schema.

2. The system as recited in claim 1, wherein at least a portion of the plurality of textual descriptors comprise customer reviews, search queries, customer questions, or customer answers provided by the users of the catalog.

3. The system as recited in claim 1, wherein the plurality of relevant attributes are determined with respect to a first relevance context, and wherein the one or more memories store additional computer-executable instructions that, when executed, cause the one or more processors to:
   select a second plurality of relevant attributes for the category of items with respect to a second relevance context, wherein the plurality of relevant attributes differs at least in part from the second plurality of relevant attributes, wherein the second plurality of relevant attributes are selected based at least in part on analysis of a second plurality of textual descriptors, and wherein the plurality of textual descriptors differs at least in part from the second plurality of textual descriptors.

4. The system as recited in claim 1, wherein the schema matching comprises ranking a plurality of potential matches between the one or more of the descriptive terms in the individual one of the source schemas and individual ones of the relevant attributes in the target schema, and wherein the ranking is based at least in part on a word order of the one or more of the descriptive terms.

5. A method, comprising:
   determining, by a catalog management system, a plurality of textual descriptors associated with a category of items in a catalog, wherein the textual descriptors indicate item attributes of the category of items;
   determining, using a similarity model for the category trained in an unsupervised machine learning process, attribute relevance metrics for individual ones of the item attributes based at least in part on customer signals in the textual descriptors;
   selecting, by the catalog management system and based least in part on the attribute relevance metrics, a plurality of relevant attributes for the category of items from among the item attributes, wherein the selection of the relevant attributes reduces a number of the item attributes indicated in the textual descriptors;
   determining a target schema for the category of items using the plurality of relevant attributes, wherein the reduction of the number of item attributes reduces a storage size of the catalog used to store the target schema; and
   modifying, by the catalog management system, the catalog based at least in part on schema matching for a plurality of items in the category, wherein the plurality of items are associated with descriptive terms from a plurality of data sources and expressed according to a plurality of source schemas, wherein, for an individual item of the plurality of items, the schema matching uses the similarity model to determine a correspondence between one or more of the descriptive terms in an individual one of the source schemas and a corresponding attribute in the target schema for the category of items.

6. The method as recited in claim 5, wherein at least a portion of the plurality of textual descriptors comprise customer reviews provided by customers of the catalog.

7. The method as recited in claim 5, wherein at least a portion of the plurality of textual descriptors comprise search queries provided by customers of the catalog.

8. The method as recited in claim 5, wherein the plurality of relevant attributes are determined with respect to a first relevance context, and wherein the method further comprises:
   determining, by the catalog management system, a second plurality of relevant attributes for the category of items with respect to a second relevance context, wherein the plurality of relevant attributes differs at least in part from the second plurality of relevant attributes, wherein the second plurality of relevant attributes are determined based at least in part on analysis of a second plurality of textual descriptors, and wherein the plurality of textual descriptors differs at least in part from the second plurality of textual descriptors.

9. The method as recited in claim 5, wherein the schema matching is performed based at least in part on word order of the descriptive terms from the plurality of data sources.

10. The method as recited in claim 5, further comprising:
   normalizing, by the catalog management system, a plurality of units of the descriptive terms from the plurality of data sources.

11. The method as recited in claim 5, wherein the schema matching comprises ranking a plurality of potential correspondences between the one or more of the descriptive terms in the individual one of the source schemas and individual ones of the relevant attributes in the target schema.

12. The method as recited in claim 5, further comprising:
   determining, by the catalog management system, a size of the plurality of relevant attributes based at least in part on a priority associated with the category of items.

13. One or more non-transitory computer-readable storage media storing program instructions that, when executed on or across one or more processors, perform:
   determining, by a catalog management system, a plurality of textual descriptors associated with a category of products in a catalog offered by an Internet-accessible store, wherein the textual descriptors indicate product attributes of the category of products;
   determining, using a similarity model for the category trained in an unsupervised machine learning process, attribute relevance metrics for individual ones of the product attributes based at least in part on customer signals in the textual descriptors;
   selecting, by the catalog management system and based least in part on the attribute relevance metrics, a plurality of relevant attributes for the category of products from among the product attributes, wherein the selection of the relevant attributes reduces a number of the product attributes indicated in the textual descriptors;
   determining, by the catalog management system, a target schema for the category of products using the plurality of relevant attributes, wherein the reduction of the number of product attributes reduces a storage size of the catalog used to store the target schema; and
   modifying, by the catalog management system, the catalog based at least in part on schema matching for a plurality of products in the category, wherein the plurality of products are associated with descriptive terms from a plurality of data sources and expressed according to a plurality of source schemas, wherein, for an individual product of the plurality of products, the schema matching uses the similarity model to determine a mapping from one or more of the descriptive terms in an individual one of the source schemas to a corresponding attribute in the target schema.

14. The one or more non-transitory computer-readable storage media as recited in claim 13, wherein at least a portion of the plurality of textual descriptors comprise customer questions or customer answers provided by customers of the catalog.

15. The one or more non-transitory computer-readable storage media as recited in claim 13, wherein at least a portion of the plurality of textual descriptors comprise product titles or product descriptions provided by a plurality of vendors of a plurality of products in the category.

16. The one or more non-transitory computer-readable storage media as recited in claim 13, wherein the plurality of relevant attributes are determined with respect to a first relevance context, and wherein the one or more non-transitory computer-readable storage media further comprise additional program instructions that, when executed on or across the one or more processors, perform:
   determining, by the catalog management system, a second plurality of relevant attributes for the category of products with respect to a second relevance context, wherein the plurality of relevant attributes differs at least in part from the second plurality of relevant attributes, wherein the second plurality of relevant attributes are determined based at least in part on analysis of a second plurality of textual descriptors, and wherein the plurality of textual descriptors differs at least in part from the second plurality of textual descriptors.

17. The one or more non-transitory computer-readable storage media as recited in claim 13, wherein the schema matching is performed based at least in part on word order of the descriptive terms from the plurality of data sources.

18. The one or more non-transitory computer-readable storage media as recited in claim 13, further comprising additional program instructions that, when executed on or across the one or more processors, perform:
   normalizing, by the catalog management system, a plurality of units of the descriptive terms from the plurality of data sources.

19. The one or more non-transitory computer-readable storage media as recited in claim 13, wherein the schema matching comprises ranking a plurality of potential mappings from the one or more of the descriptive terms in the individual one of the source schemas to individual ones of the relevant attributes in the target schema.

20. The one or more non-transitory computer-readable storage media as recited in claim 13, further comprising additional program instructions that, when executed on or across the one or more processors, perform:
   determining, by the catalog management system, a size of the plurality of relevant attributes based at least in part on one or more performance goals or computing resource usage metrics associated with the category of products.

* * * * *